United States Patent
Kopecek et al.

(10) Patent No.: US 11,035,320 B2
(45) Date of Patent: Jun. 15, 2021

(54) OVER-CENTER THRUST REVERSER PRIMARY LOCK

(71) Applicant: Woodward, Inc., Fort Collins, CO (US)

(72) Inventors: Joseph Thomas Kopecek, Santa Clarita, CA (US); Julian Sweet, Pasadena, CA (US)

(73) Assignee: Woodward, Inc., Fort Collins, CO (US)

( * ) Notice: Subject to any disclaimer, the term of this patent is extended or adjusted under 35 U.S.C. 154(b) by 0 days.

(21) Appl. No.: 16/852,991

(22) Filed: Apr. 20, 2020

(65) Prior Publication Data

US 2020/0386185 A1 Dec. 10, 2020

Related U.S. Application Data

(62) Division of application No. 15/409,240, filed on Jan. 18, 2017, now Pat. No. 10,662,897.

(51) Int. Cl.
*F02K 1/76* (2006.01)
*E05B 47/00* (2006.01)
(Continued)

(52) U.S. Cl.
CPC .......... *F02K 1/766* (2013.01); *E05B 47/0012* (2013.01); *E05B 83/00* (2013.01);
(Continued)

(58) Field of Classification Search
CPC .......... F02K 1/766; F02K 1/763; E05B 83/00; E05C 19/12; F05D 2260/30;
(Continued)

(56) References Cited

U.S. PATENT DOCUMENTS 2,869,426 A 1/1959 Wilkie
2,971,792 A 2/1961 Steinmetz
(Continued)

FOREIGN PATENT DOCUMENTS

DE 19845584 A1 4/2000
GB 890178 A 2/1962
(Continued)

OTHER PUBLICATIONS

International Search Report and Written Opinion in International Application No. PCT/US2018/012534, dated Jun. 28, 2018, 10 pages.

(Continued)

*Primary Examiner* — Mark A Williams
(74) *Attorney, Agent, or Firm* — Fish & Richardson P.C.

(57) ABSTRACT

The subject matter of this specification can be embodied in, among other things, a lock apparatus that includes a latch hook having a catch at a first latch end, a first pivotal mount at a second latch end opposite the first latch end, and a second pivotal mount, a rotary actuator configured to selectably rotate a rotor shaft in a first rotary direction and in a second rotary direction opposite the first rotary direction, a rotor arm coupled to the rotor shaft at a first arm end and extending radially outward from the rotor shaft to a second arm end opposite the first arm end, and a link arm pivotably connected to the second arm end at a first link end, and pivotably connected to the second pivotal mount at a second link end opposite the first link end.

7 Claims, 7 Drawing Sheets

(51) Int. Cl.
*E05B 83/00* (2014.01)
*E05C 19/12* (2006.01)

(52) U.S. Cl.
CPC .............. *E05C 19/12* (2013.01); *F02K 1/763* (2013.01); *F05D 2260/30* (2013.01); *F05D 2260/50* (2013.01); *F05D 2260/52* (2013.01); *F05D 2260/57* (2013.01); *Y02T 50/60* (2013.01)

(58) Field of Classification Search
CPC .............. F05D 2260/50; F05D 2260/52; F05D 2260/57; Y02T 50/60
See application file for complete search history.

(56) References Cited

U.S. PATENT DOCUMENTS

| | | |
|---|---|---|
| 3,068,034 A | 12/1962 | Campbell |
| 3,081,121 A | 3/1963 | Campbell |
| 3,752,034 A | 8/1973 | Waters |
| 3,807,784 A | 4/1974 | Laky |
| 4,017,107 A | 4/1977 | Hanchett |
| 4,313,582 A | 2/1982 | Hasguenoph |
| 4,927,996 A | 5/1990 | Genbauffe |
| 4,979,384 A | 12/1990 | Malesko et al. |
| 5,819,527 A | 10/1998 | Fournier |
| 5,953,904 A | 9/1999 | Mountney |
| 6,260,801 B1 | 7/2001 | Peters et al. |
| 6,315,336 B1 | 11/2001 | Swartzell |
| 7,980,603 B2 | 7/2011 | Peabody et al. |
| 8,181,905 B2 | 5/2012 | McDonough et al. |
| 8,628,128 B2 | 1/2014 | Sternberger et al. |
| 2003/0116975 A1 | 6/2003 | Cole |
| 2003/0146643 A1 | 8/2003 | Dietl |
| 2010/0109349 A1 | 5/2010 | Peabody et al. |
| 2010/0148012 A1 | 6/2010 | McDonough et al. |
| 2013/0106119 A1 | 5/2013 | Stendal |
| 2015/0300294 A1 | 10/2015 | Chakkera |
| 2016/0201364 A1 | 7/2016 | Starman |

FOREIGN PATENT DOCUMENTS

| | | |
|---|---|---|
| GB | 1316513 A | 5/1973 |
| WO | WO1997016614 A1 | 5/1997 |
| WO | WO0157382 A2 | 8/2001 |
| WO | WO2001057382 | 8/2001 |
| WO | WO2016087822 A1 | 6/2016 |

OTHER PUBLICATIONS

International Preliminary Report on Patentability in International Application No. PCT/US2018/012534, dated Aug. 1, 2019, 7 pages.

OVER-CENTER THRUST REVERSER PRIMARY LOCK

CROSS-REFERENCE TO RELATED PATENT APPLICATIONS

This application is a divisional of and claims the benefit of priority to U.S. patent application Ser. No. 15/409,240, filed Jan. 18, 2017, the contents of which are incorporated by reference herein.

TECHNICAL FIELD

This instant specification relates to lock mechanisms for thrust reverser actuation systems.

BACKGROUND

Thrust Reverser Actuation Systems (TRAS) power and control the deployment of aircraft thrust reversers. Thrust reversal, also called reverse thrust, involves the temporary diversion of a jet aircraft's exhaust so that it acts against the forward travel of the aircraft, providing deceleration, for example, to help slow an aircraft after touch-down. Such devices are considered important for safe operations by airlines.

However, such devices can also negatively affect the operation of an aircraft if they are misused or malfunction. A number of aircraft accidents have been traced back to accidental TRAS deployments. As such, many TRAS designs include locking mechanisms to ensure that the TRAS remains stowed until needed. Many of these systems utilize large bias springs to bias locks toward the locked position and to overcome vibration and air load forces, and use hydraulic linear actuators with high power densities to overcome the bias springs in order to release the lock. Such systems add weight and consume space, both of which can be limited, especially in aircraft applications.

SUMMARY

In general, this document describes lock mechanisms for thrust reverser actuation systems.

In a first aspect, a lock apparatus includes a latch hook having a catch at a first latch end, a first pivotal mount at a second latch end opposite the first latch end, and a second pivotal mount, a rotary actuator configured to selectably rotate a rotor shaft in a first rotary direction and in a second rotary direction opposite the first rotary direction, a rotor arm coupled to the rotor shaft at a first arm end and extending radially outward from the rotor shaft to a second arm end opposite the first arm end, and a link arm pivotably connected to the second arm end at a first link end, and pivotably connected to the second pivotal mount at a second link end opposite the first link end.

Various embodiments can include some, all, or none of the following features. The apparatus can include a bias member configured to bias the rotor shaft in the first rotary direction. The apparatus can include a stop configured to prevent rotation of the rotor shaft past a first rotary position in the first rotary direction. The apparatus can include a receiver configured to engage the catch. The latch hook, the rotor arm, and the link arm can form a bistable over-center mechanism configurable to at least a first configuration in which the rotary actuator is rotated in the first direction to a first rotary position such that the receiver is engaged with the catch, and a second configuration in which the rotary actuator is rotated in the second rotary direction to a second position such that the receiver is disengaged from the catch. The apparatus can include a second link arm pivotally connected to the rotor arm at the second shaft end and pivotally connected to the link arm at the first link end. The apparatus can include a guide configured to constrain angular movement of the link arm and permit guided linear movement of the link arm. The apparatus can include a moveable stop configured to prevent rotation of the rotor shaft past a second rotary position in the second rotary direction in a first stop configuration, and permit rotation of the rotor shaft past the second rotary position in the second rotary direction in a second stop configuration. The apparatus can include a moveable stop configured to prevent movement of at least one of the rotor arm and the link arm in a first stop configuration, and permit movement of the rotor arm or the link arm in a second stop configuration. The second pivotal mount can be between the first latch end and the second latch end.

In a second aspect, a method for reversible locking includes providing a lock apparatus having a latch hook having a catch at a first latch end, a first pivotal mount at a second latch end opposite the first latch end, and a second pivotal mount, a rotary actuator configured to selectably rotate a rotor shaft in a first rotary direction and in a second rotary direction opposite the first rotary direction, a rotor arm coupled to the rotor shaft at a first arm end and extending radially outward from the rotor shaft to a second arm end opposite the first arm end, and a link arm pivotably connected to the second arm end at a first link end, and pivotably connected to the second pivotal mount at a second link end opposite the first link end, rotating the rotary actuator in a first direction to a first rotary position, engaging, during the rotating, the catch with a receiver, rotating the rotary actuator in a second direction opposite the first direction to a second rotary position, and disengaging the catch from the receiver.

Various implementations can include some, all, or none of the following features. The method can include contacting a stop at the first rotary position, and stopping, by the stop, rotation of the rotary actuator in the first rotary direction at the first rotary position. The method can include applying a back force to the catch while rotary actuator is proximal the first rotary position, urging rotation of the rotary actuator in the first rotary direction, resisting, by the stop, the back force, and maintaining engagement of the catch and the receiver. The method can include urging, by a bias member, the rotary actuator in the first rotary direction. The method can include configuring a moveable stop in a first configuration, urging rotation of the rotary actuator in the second rotary direction, contacting the moveable stop at a second rotary position, stopping, by the moveable stop in the first configuration, rotation of the rotary actuator in the second rotary direction at the second rotary position, configuring the moveable stop in a second configuration, urging rotation of the rotary actuator in the second rotary direction, and rotating the rotary actuator in the second rotary direction past the second position. The method can include configuring a moveable stop in a first configuration, urging movement of the link arm, stopping, by the moveable stop in the first configuration, movement of the link arm, configuring the moveable stop in a second configuration, urging movement of the link arm, and permitting, by the moveable stop in the second configuration, movement of the link arm. The lock apparatus can include a second link arm pivotally connected to the rotor arm at the second shaft end and pivotally connected to the link arm at the first link end, and the method can include constraining, by a guide, angular movement of the link arm, and moving the link arm linearly through the guide.

The systems and techniques described here may provide one or more of the following advantages. First, a system can provide a robust locking action. Second, the system can be implemented with actuators having reduced space and weight requirements. Third, the system can be driven electrically rather than hydraulically or pneumatically. Fourth, the system can be implemented without the additional use of gearboxes or stroke amplifiers.

The details of one or more implementations are set forth in the accompanying drawings and the description below. Other features and advantages will be apparent from the description and drawings, and from the claims.

DETAILED DESCRIPTION

This document describes systems and techniques for locking a thrust reverser actuation system (TRAS). Many TRAS systems include locking mechanisms to keep jet engine reverser cowl sections from deploying accidentally. Some existing TRAS locking mechanisms systems utilize large bias springs to bias locks toward the locked position and to overcome vibration and air load forces, and use hydraulic linear actuators with high power densities to overcome the bias springs in order to release the locks. Such systems add weight and consume space, both of which can be limited especially in aircraft applications.

Electric actuation generally has a lower power density and range of motion when compared to hydraulic actuation, which limits the use of electric systems as replacements for hydraulics. For example, electric motor-driven locks sometimes require the use of gearing, control systems, limit switches, and other components in order to replicate the power and range of a hydraulic system, but such components add weight, add cost, and consume space. In other examples, electric linear solenoids can be used, but solenoids generally have strokes that are too short (e.g., 80 to 100 thousandths of an inch) to use as a replacement for hydraulics without stroke amplification. However, mechanisms for stroke amplification also consume space, add cost and weight, and also generally trade solenoid force in exchange for stroke length thereby reducing overall robustness of the system.

Generally speaking, the systems and techniques described in this document use rotary electric actuation, rather than linear hydraulic or pneumatic actuation, to lock a TRAS. The rotary actuators are used to actuate over-center mechanisms to lock and unlock the TRAS, rather than lock and unlock the TRAS directly. The over-center mechanisms can provide the desired robustness needed to keep a TRAS secured, and actuation of the over-center mechanisms can be performed with a relatively low amount of mechanical power (e.g., when compared to the amount of power needed to secure a TRAS lock directly).

Figure 1A:
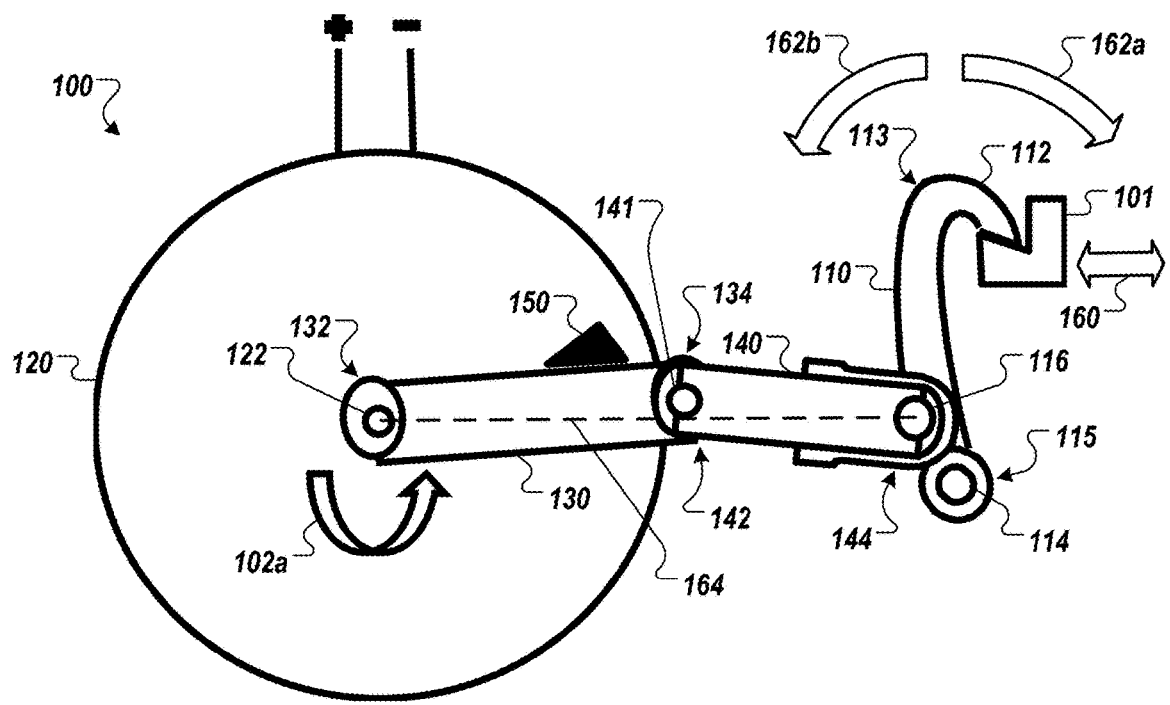
FIGS. 1A and 1B are schematic diagrams that show an example of a system for locking a thrust reverser actuation system (TRAS).
Figure 1B:
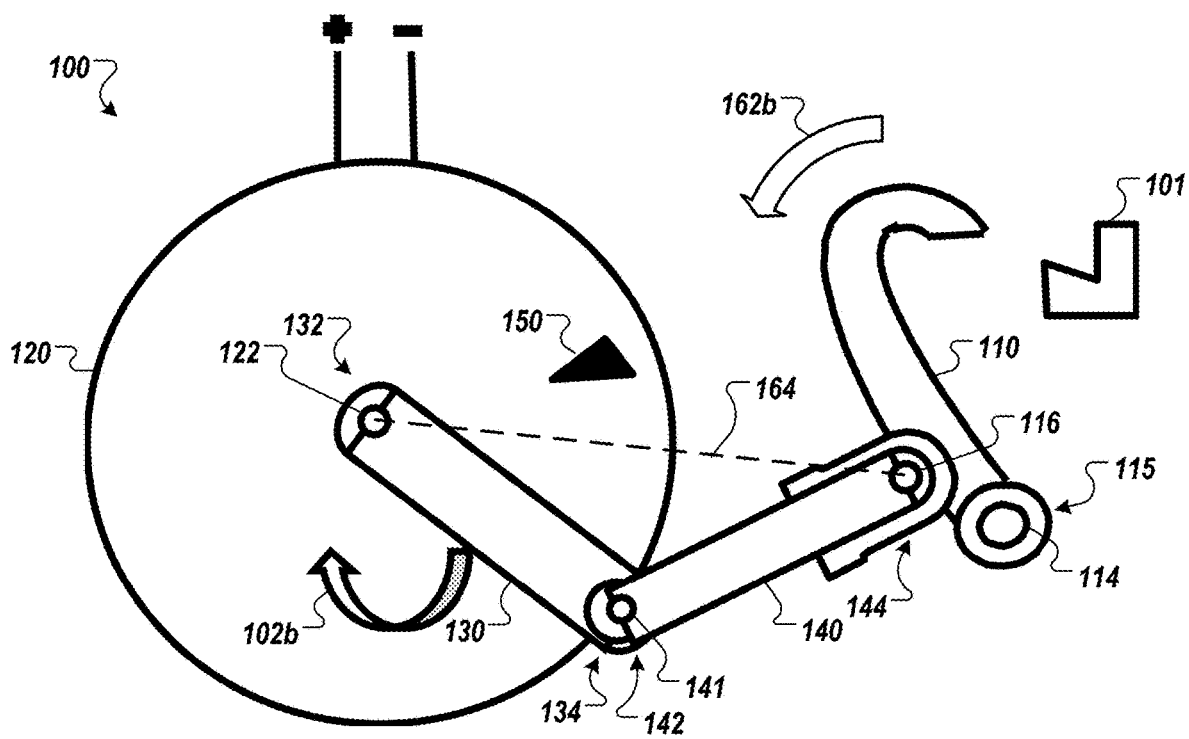

FIGS. 1A and 1B are schematic diagrams that show an example of a system 100 for locking a thrust reverser actuation system (TRAS). In the illustrated example, the TRAS is not shown in its entirety; a receiver 101 (e.g., catch, latch) of a TRAS reverser door (not shown) is included for purposes of describing the operation of the system 100.

The system 100 includes a latch hook 110 having a catch 112 at a first latch end 113, a first pivotal mount 114 at a second latch end 115 opposite the first latch end 113, and a second pivotal mount 116 at a midpoint of the latch hook 110. A rotary actuator 120 is configured to selectably rotate a rotor shaft 122 in a first rotary direction (e.g., counterclockwise in the current example), represented by the arrow 102a in FIG. 1A, and in a second rotary direction, represented by the arrow 102b in FIG. 1B, opposite the first rotary direction 102a (e.g., clockwise in the current example). In some embodiments, the rotary actuator 120 can be an electric motor or a rotary electric solenoid. In some embodiments, the rotary actuator 120 can be a rotary fluid actuator (e.g., pneumatic, hydraulic).

A rotor arm 130 is coupled to the rotor shaft 122 at a first arm end 132 and extends radially outward from the rotor shaft 122 to a second arm end 134 opposite the first arm end 132. A link arm 140 (e.g., an idler link) is pivotably connected to the second arm end 134 by a third pivotal mount 141 at a first link end 142, and is pivotably connected to the second pivotal mount 116 at a second link end 144 opposite the first link end 142.

The system 100 also includes a stop 150 (e.g., an over-center stop). The stop 150 is configured to prevent rotation of the rotor arm 130 and the rotor shaft 122 past a first rotary position in the first rotary direction 102a. For example, in FIG. 1A, the rotor arm 130 is rotated counterclockwise by the rotor shaft 122 to contact the stop 150 at a rotary position that is slightly less than 90 degrees (e.g., a bit less than the three o'clock position) from top dead center (e.g., the twelve o'clock position).

Referring to FIG. 1A, the catch 112 is engaged with the receiver 101. The receiver 101 is confined to move linearly, substantially perpendicular to the latch hook 110, as illustrated by arrows 160. The rotor arm 130 and the link arm 140 form a linkage in which pivotal movement of the latch hook 110 can urge rotation of the rotary actuator 120. In general, clockwise motion of the latch arm 110 will create tension along the rotor arm 130 and urge rotation of the rotary actuator 120 such that the third pivotal mount 141 is drawn into substantially direct alignment between the rotor shaft 122 and the second pivotal mount 116, as represented by line 164. Such a configuration is substantially stable in tension, but is mechanically unstable in compression. Counterclockwise motion of the latch arm 110 will compress the rotor arm 130, cause the rotor arm 130 to pivot relative to the link arm 140 about the third pivotal mount 141, and in turn urge rotation of the rotary actuator 120.

The direction of rotation of the rotary actuator 120 is generally determined by the rotational side (e.g., clockwise or counterclockwise) of the line 164 the third pivotal mount 141 is already on. For example, if the third pivotal mount 141 is positioned counterclockwise relative to the line 164, then compression of the rotor arm 130 will generally urge further counterclockwise rotation of the rotary actuator 120.

In another example if the third pivotal mount 141 is positioned clockwise relative to the line 164, then compression of the rotor arm 130 will generally urge further clockwise rotation of the rotary actuator 120.

Stability of the system 100 in compression is provided by the stop 150. The stop 150, the rotor shaft 122, the rotor arm 130, the third pivotal mount 141, and the link arm 140 form an over center linkage that prevents back-driving of the system 100.

In the illustrated example, the rotor shaft 122 is rotated such that the rotor arm 130 is rotated past direct alignment with the line 164, such that the third pivotal mount 141 is not positioned along the line 164. The third pivotal mount 141 and the rotor arm 130 are positioned counterclockwise relative to the line 164. As such, counterclockwise motion of the latch hook 110 (e.g., caused by leftward, back-driving movement of the receiver toward the system 100) can urge counterclockwise rotation of the rotary actuator 120. Counterclockwise rotation of the rotor arm 130 is limited by the stop 150. As such, the stop 150 resists further counterclockwise rotation of the rotor arm 130, and by resisting such further rotation the stop 150 resists the counterclockwise motion of the latch arm 110 caused by the leftward, back-driving movement of the receiver 101. With the back-driving forces being resisted, the catch 122 is kept in engagement with the receiver 101.

In the illustrated configuration, movement of the receiver 101 away from the system 100 (e.g., to the right) urges contact between the catch 112 and the receiver 101, which in turn urges clockwise pivotal motion, represented by arrow 162a, of the latch hook 110. Such pivotal motion draws the catch 112 into more forceful engagement with the receiver 101, resisting disengagement of the receiver 101 from the system 100.

Referring now to FIG. 1B, the system 100 is shown in a disengaged configuration. In the illustrated example, the rotary actuator 120 is actuated to rotate the rotor arm 130 clockwise, away from the stop 150, past the line 164. Such rotary motion urges counterclockwise motion 162b of the latch hook 110, causing the catch 112 to disengage from the receiver 101.

Figure 2A:
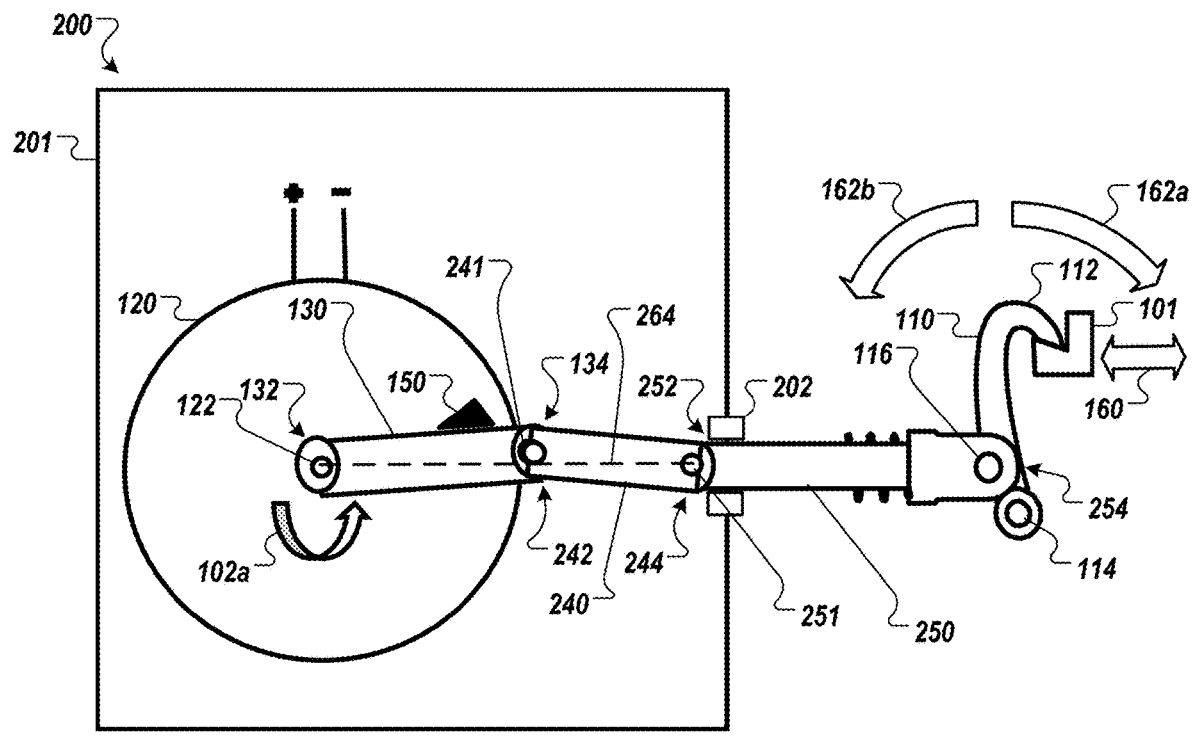
FIGS. 2A and 2B are schematic diagrams that show another example of a system for locking a TRAS.
Figure 2B:
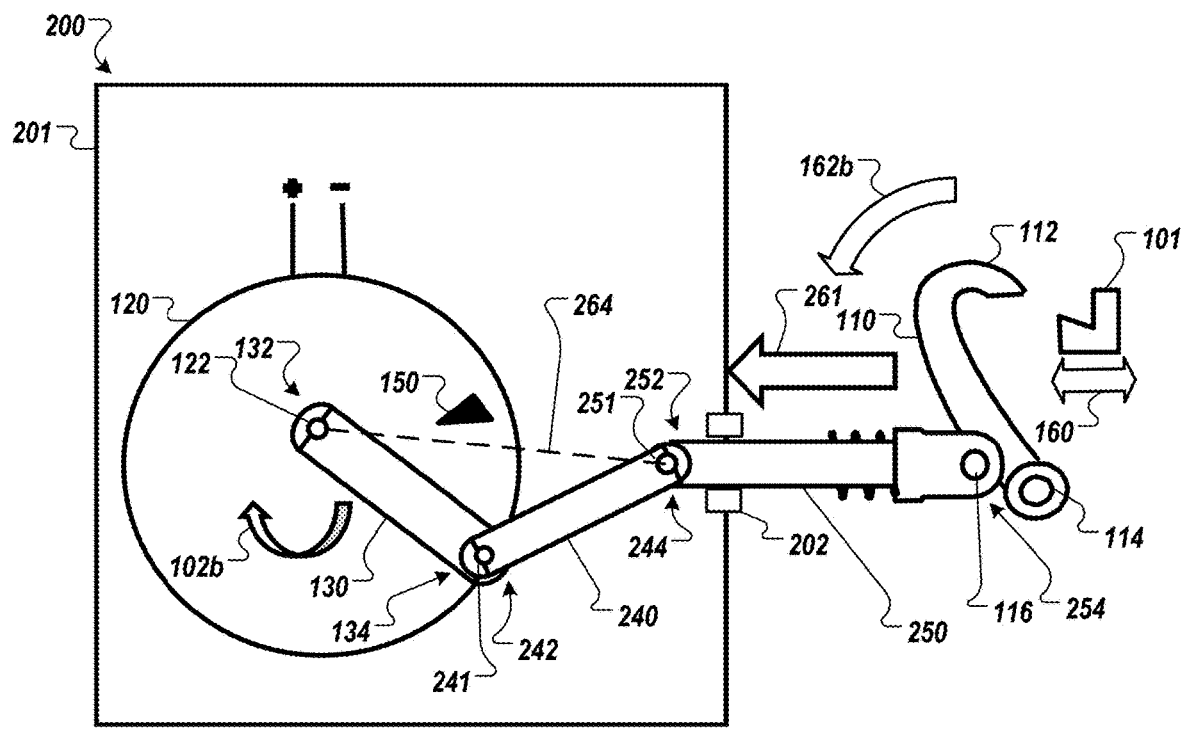

FIGS. 2A and 2B are schematic diagrams that show an example of another system 200 for locking a TRAS. In general, the system 200 is substantially similar to the system 100, with the addition of a protective housing 201 (e.g., a de-icing boot) configured to protect various moving components of the system 200 (e.g., parts that could become jammed or short-circuited by debris, such as ice or de-icing agents). In the illustrated example, the TRAS is not shown in its entirety; the receiver 101 (e.g., a catch or latch) of a TRAS reverser door (not shown) is included for purposes of describing the operation of the system 200.

The system 200 includes the latch hook 110. The rotary actuator 120 is configured to selectably rotate the rotor shaft 122 in the first rotary direction (e.g., counterclockwise in the current example), represented by the arrow 102a in FIG. 2A, and in the second rotary direction, represented by the arrow 102b in FIG. 2B, opposite the first rotary direction 102a (e.g., clockwise in the current example).

The rotor arm 130 is coupled to the rotor shaft 122 at a first arm end 132 and extends radially outward from the rotor shaft 122 to the second arm end 134. A first link arm 240 (e.g., an idler link) is pivotably connected to the second arm end 134 by a third pivotal mount 241 at a first link end 242, and is pivotably connected to a second link arm 250 (e.g., a guided rod) by a fourth pivotal mount 251 at a second link end 244 opposite the first link end 242. The second link arm 250 extends from the fourth pivotal mount 251 at a third link end 252 to a fourth link end 254 opposite the third link end 252. The second link arm 250 is pivotably connected to the latch hook 110 by the second pivotal mount 116.

The second link arm 250 is configured to extend through and retract from the protective housing 201. Motion of the second link arm 250 is directed by a guide 202 (e.g., to constrain the section link arm 250 to move reciprocally along a linear, axial path of motion). Referring now to FIG. 2B, the motion of the second link arm 250 is substantially linear, represented by the arrow 261. In some embodiments, a seal or compliant boot may be included between the protective housing 201 and the second link arm 250 to permit movement of the second link arm 250 relative to the protective housing 201 while also resisting intrusion of outside debris and contaminants into the protective housing 201.

Returning to FIG. 2A, the system 200 also includes the stop 150. The stop 150 is configured to prevent rotation of the rotor arm 130 and the rotor shaft 122 past a first rotary position in the first rotary direction 102a. For example, in FIG. 2A, the rotor arm 130 is rotated counterclockwise by the rotor shaft 122 to contact the stop 150 at a rotary position that is slightly less than 90 degrees (e.g., a bit less than the three o'clock position) from top dead center (e.g., the twelve o'clock position).

Still referring to FIG. 2A, the catch 112 is engaged with the receiver 101. The receiver 101 is confined to move linearly, substantially perpendicular to the latch hook 110, as illustrated by arrows 160. The rotor arm 130, the first link arm 240, and the second link arm 250 form a linkage in which pivotal movement of the latch hook 110 can urge rotation of the rotary actuator 120. In general, clockwise motion of the latch arm 110 will create tension along the rotor arm 130 and urge rotation of the rotary actuator 120 such that the third pivotal mount 241 is drawn into substantially direct alignment between the rotor shaft 122 and the fourth pivotal mount 251, as represented by line 264. Such a configuration is substantially stable in tension, but is mechanically unstable in compression. Counterclockwise motion of the latch arm 110 will compress the second link arm 250, compress the first link arm 240, compress the rotor arm 130, cause the rotor arm 130 to pivot relative to the first link arm 240 about the third pivotal mount 241, and in turn urge rotation of the rotary actuator 120.

The direction of rotation of the rotary actuator 120 is generally determined by what rotational side (e.g., clockwise or counterclockwise) of the line 264 the third pivotal mount 241 is already on. For example, if the third pivotal mount 241 is positioned counterclockwise relative to the line 264, then compression of the rotor arm 130 will generally urge further counterclockwise rotation of the rotary actuator 120. In another example if the third pivotal mount 241 is positioned clockwise relative to the line 264, then compression of the rotor arm 130 will generally urge further clockwise rotation of the rotary actuator 120.

Stability of the system 200 in compression is provided by the stop 150. The stop 150, the rotor shaft 122, the rotor arm 130, the third pivotal mount 241, the link arm 140, the second link arm 250, and the fourth pivotal mount 251 form an over center linkage that prevents back-driving of the system 200.

In the illustrated example, the rotor shaft 122 is rotated such that the rotor arm 130 is rotated past direct alignment with the line 264, such that the third pivotal mount 241 is not positioned along the line 264. The third pivotal mount 241 and the rotor arm 130 are positioned counterclockwise relative to the line 264. As such, counterclockwise motion of the latch hook 110 (e.g., caused by leftward, back-driving movement of the receiver toward from the system 200) can urge counterclockwise rotation of the rotary actuator 120. Counterclockwise rotation of the rotor arm 130 is limited by the stop 150. As such, the stop 150 resists further counterclockwise rotation of the rotor arm 130, and by resisting such further rotation the stop 150 resists the counterclockwise motion of the latch arm 110 caused by the leftward, back-driving movement of the receiver 101. With the back-driving forces being resisted, the catch 112 is kept in engagement with the receiver 101.

In the illustrated configuration, movement of the receiver 101 away from the system 200 (e.g., to the right) urges contact between the catch 112 and the receiver 101, which in turn urges clockwise pivotal motion, represented by arrow 162a, of the latch hook 110. Such pivotal motion draws the catch 112 into more forceful engagement with the receiver 101, resisting disengagement of the receiver 101 from the system 200.

Referring now to FIG. 2B, the system 200 is shown in a disengaged configuration. In the illustrated example, the rotary actuator 120 is actuated to rotate the rotor arm 130 clockwise, away from the stop 150, past the line 264. Such rotary motion urges counterclockwise motion 162b of the latch hook 110, causing the catch 112 to disengage from the receiver 101.

Figure 3A:
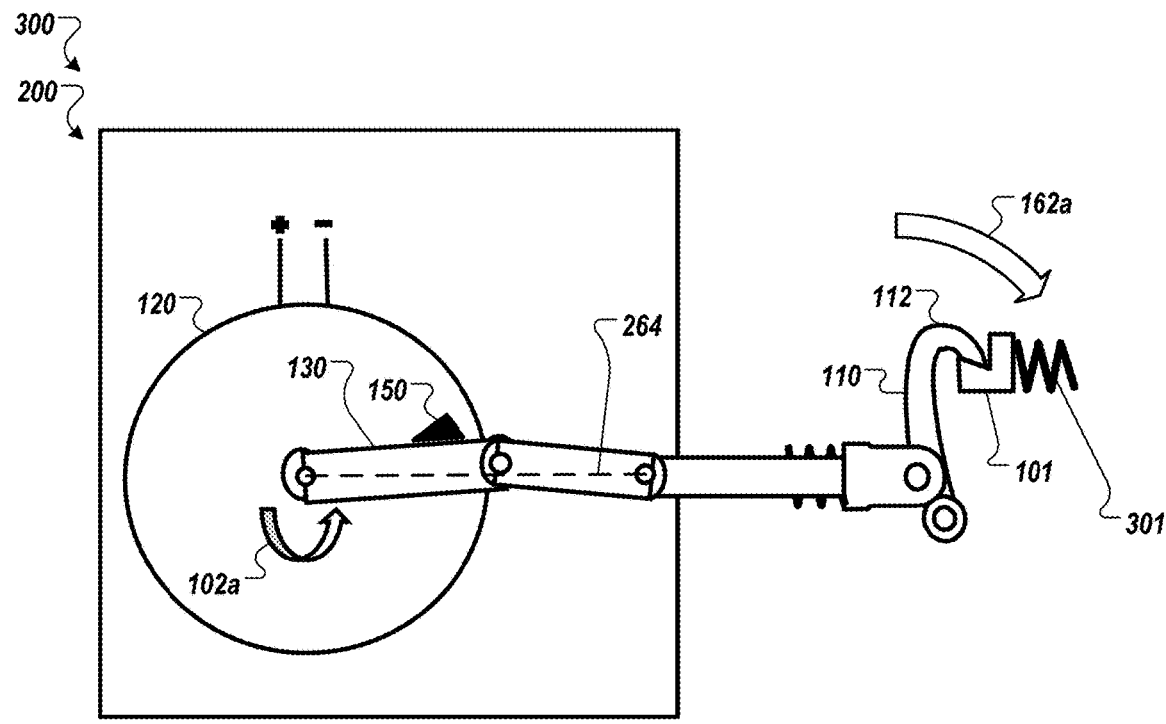
FIGS. 3A and 3B are schematic diagrams that show another example of a system for locking a TRAS.
Figure 3B:
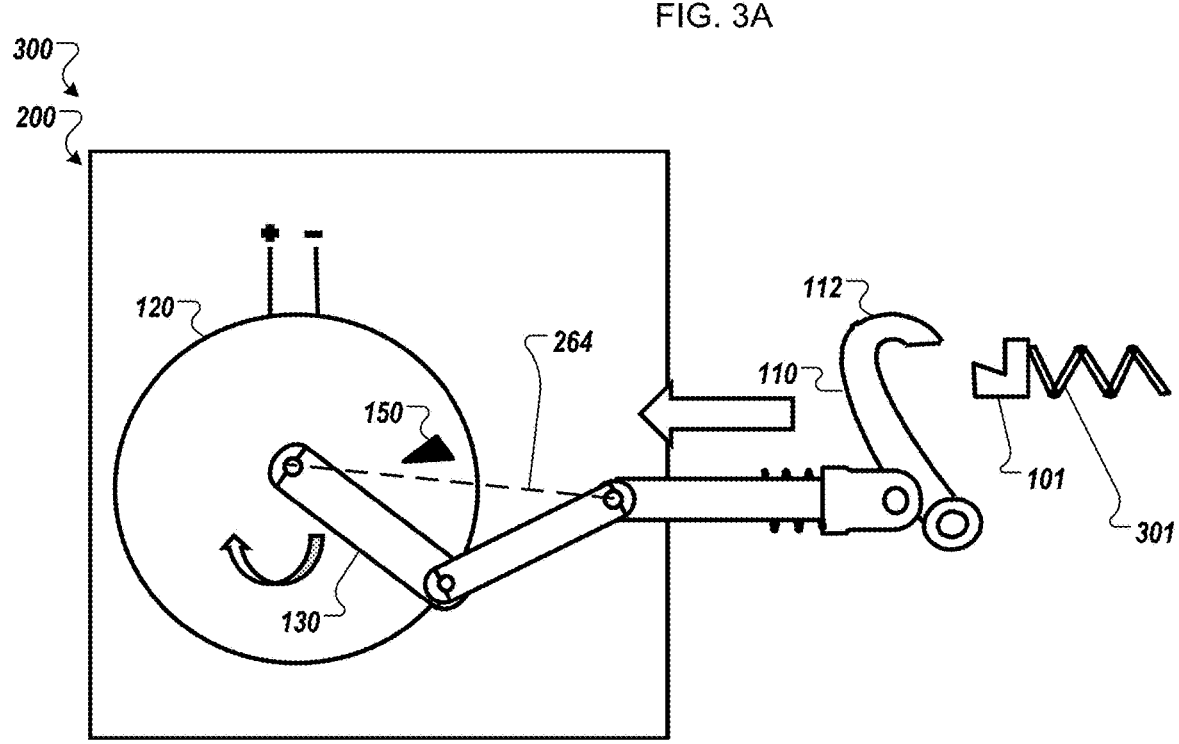

FIGS. 3A and 3B are schematic diagrams that show an example of another system 300 for locking a TRAS. In general, the system 300 is the system 200 of FIGS. 2A and 2B, with the addition of a compliant member 301 (e.g., a spring) between the receiver 101 and a component to be latched, such as a TRAS reverser door (not shown). In some embodiments, the compliant member 301 can be added to the system 100 of FIGS. 1A and 1B as well.

In FIG. 3B, the system 300 is shown in an unlatched configuration in which the catch 112 of the latch arm 110 is disengaged from the receiver 101. In FIG. 3A, the system 300 is shown in a latched configuration in which the catch 112 of the latch arm 110 is engaged with the receiver 101. To drive the system 300 from the unlatched configuration shown in FIG. 3B to the latched configuration shown in FIG. 3A, the rotary actuator 120 rotates the rotor arm 130 counterclockwise to urge the catch 112 toward, and eventually into contact with the receiver 101.

As the rotor arm 130 approaches alignment with the line 264 in the counterclockwise direction 102a, the catch 112 is urged into compression with the receiver 101, compressing the compliant member 310. As the rotor arm 130 is rotated over center, past the line 264, expansion of the compliant member 301 back-drives the system 300 to urge the rotor arm 130 away from the line 264 in the direction 102a and into contact with the stop 150.

The addition of the compliant member 301 provides additional functionality to the system 200. In the example of the system 200, the rotary actuator 120 may be kept energized in order to maintain the rotor arm in a position between the line 164 and the stop 150, such that any back-driving of the linkage will be resisted by contact between the rotor arm 130 and the stop 150. In the example of the system 300, once latched (e.g., as depicted in FIG. 3A) the rotor arm 130 is continually urged past the line 264 and into contact with the stop 150 by the back-driving force provided by the compliant member 301. In such examples, the catch 112 will remain engaged with the receiver 101 even if latching (e.g., counterclockwise rotational) power is removed from the rotary actuator 120 intentionally (e.g., to conserve power) or unintentionally (e.g., a power outage).

Figure 4A:
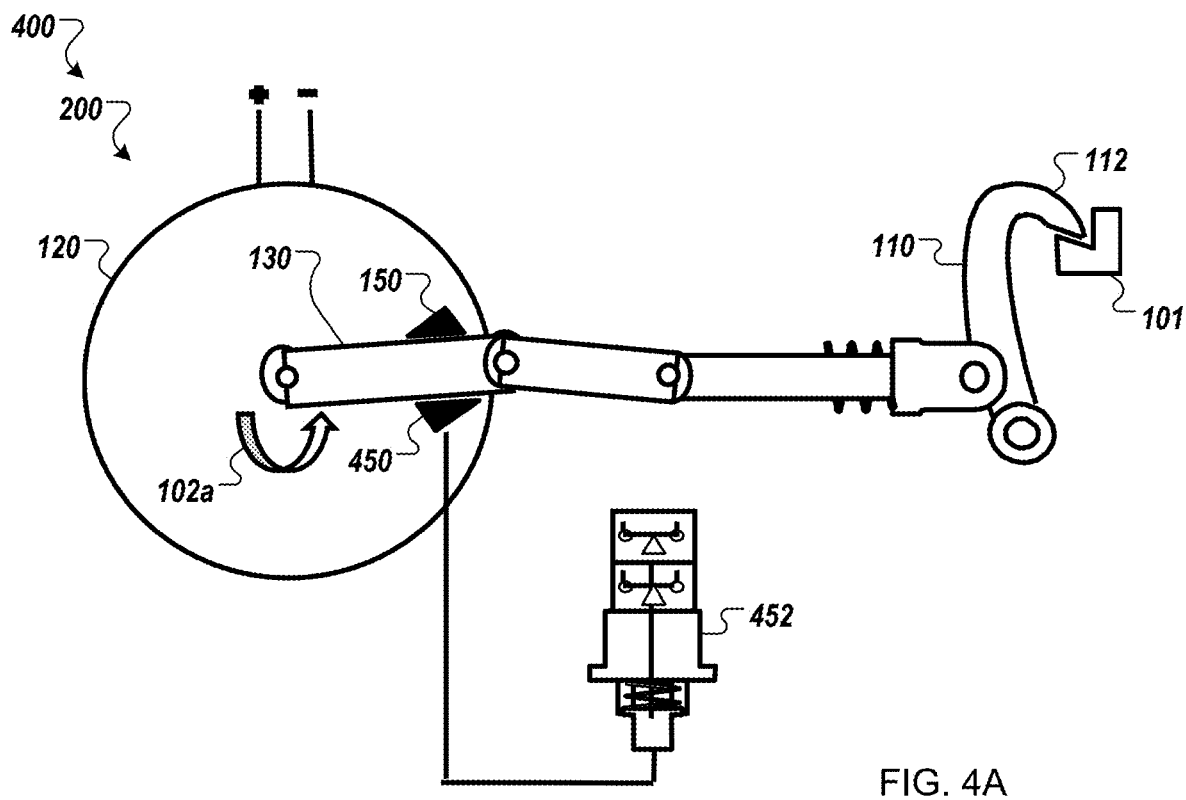
FIGS. 4A and 4B are schematic diagrams that show another example of a system for locking a TRAS.
Figure 4B:
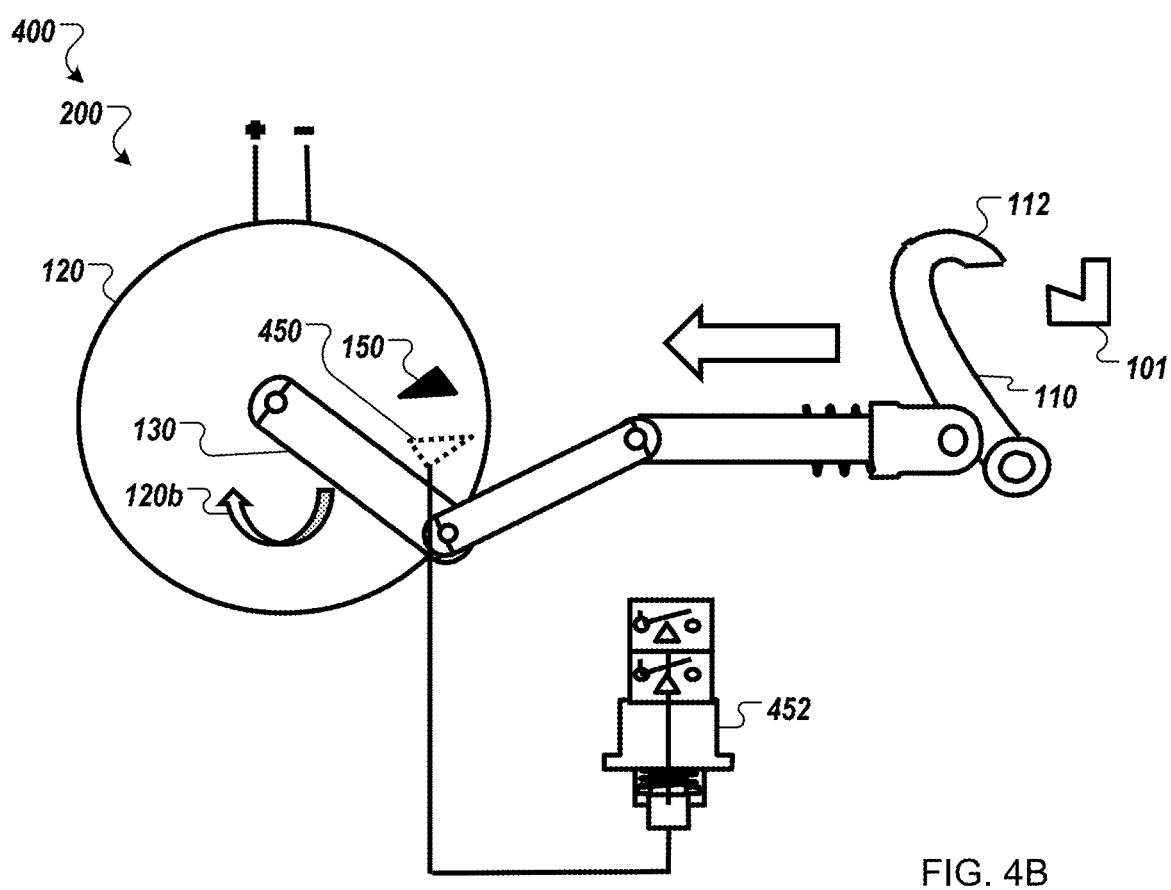

FIGS. 4A and 4B are schematic diagrams that show an example of another system 400 for locking a TRAS. In general, the system 400 is the system 200 of FIGS. 2A and 2B, with the addition of a second stop 450. In some embodiments, the stop 450 can be added to the system 100 of FIGS. 1A and 1B as well.

As in the example systems 100, 200, and 300 of FIGS. 1A-3B, the stop 150 limits rotation of the rotor arm 130, by the rotary actuator 120, in the counterclockwise direction 102a. However, in the example of the system 400, the stop 450 is also present in the rotational path of the rotor arm 130. The stop 450 is spaced apart from the stop 150 far enough to provide space for the rotor arm 130 (or some portion thereof) to be rotationally constrained between the stop 150 in the counterclockwise direction 102a and the stop 450 in the clockwise direction 102b when the rotor arm 130 is in the over-center, latched configuration shown in FIG. 4A.

The stop 450 is moveable to selectively block (baulk) or permit (unbaulk) movement of the rotor arm 130, in the clockwise direction 102b, away from the latched configuration. An actuator 452 is controllable to actuate the movement of the stop 450. For example, the stop 450 can be mounted on a piston that is configured to extend and retract the stop 450 into and out of the path of rotation of the rotor arm 130 (e.g., into an out of the plane of the views shown in FIGS. 4A and 4B), and the actuator 452 can provide fluid (e.g., hydraulic, pneumatic) to drive the motion of the piston. In another example, the stop 450 can be mounted on a solenoid (e.g., a baulking solenoid) or other linear or rotary actuator that is configured to move the stop 450 into and out of the path of rotation of the rotor arm 130, and the actuator 452 can provide electrical power (e.g., a switch, a motor driver) to drive the motion of the stop 450.

Referring now to FIG. 4A, the rotor arm 130 is in the over-center, latched configuration. Rotation of the rotor arm 130 is constrained in the counterclockwise direction 102a by the stop 150, providing resistance against back-driving of the system 400 through the latch arm 110. Rotation of the rotor arm 130 is constrained in the clockwise direction 102b by the stop 450, preventing the rotor arm 130 from moving out of the over-center, latched configuration. In such examples, the catch 112 will remain engaged with the receiver 101 even if latching (e.g., counterclockwise rotational) power is removed from the rotary actuator 120 intentionally (e.g., to conserve power) or unintentionally (e.g., a power outage).

Referring now to FIG. 4B, the actuator 452 can actuated the stop 450 such that the stop 450 is moved (as represented by the dotted lines in FIG. 4B) out of the path of rotation of the rotor arm 130. As such, the rotary actuator 120 can be actuated to rotate the rotor arm 130 in the clockwise direction 102b, out of the latched configuration and disengage the catch 112 from contact with the receiver 101.

In some embodiments, other forms of the stop 450 can be implemented. For example, instead of mechanically interfering with the motion of the rotor arm 130, a stop can be configured to interfere with rotation of the rotary actuator (e.g., a clutch, a stop pin, escapement).

Figure 5A:
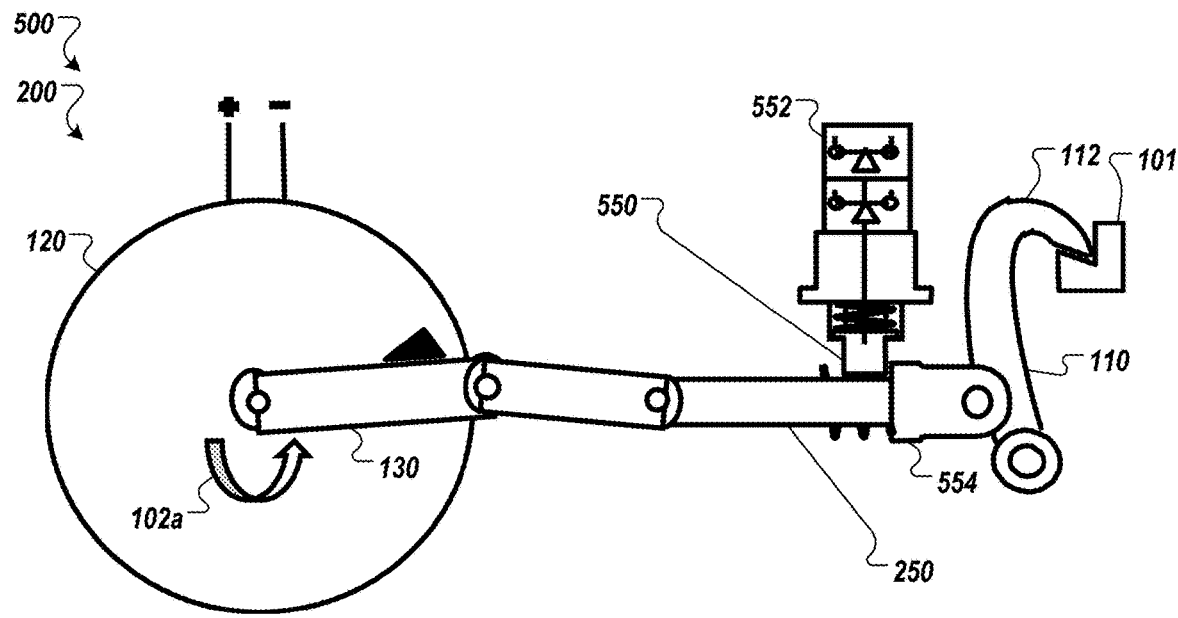
FIGS. 5A and 5B are schematic diagrams that show another example of a system for locking a TRAS.
Figure 5B:
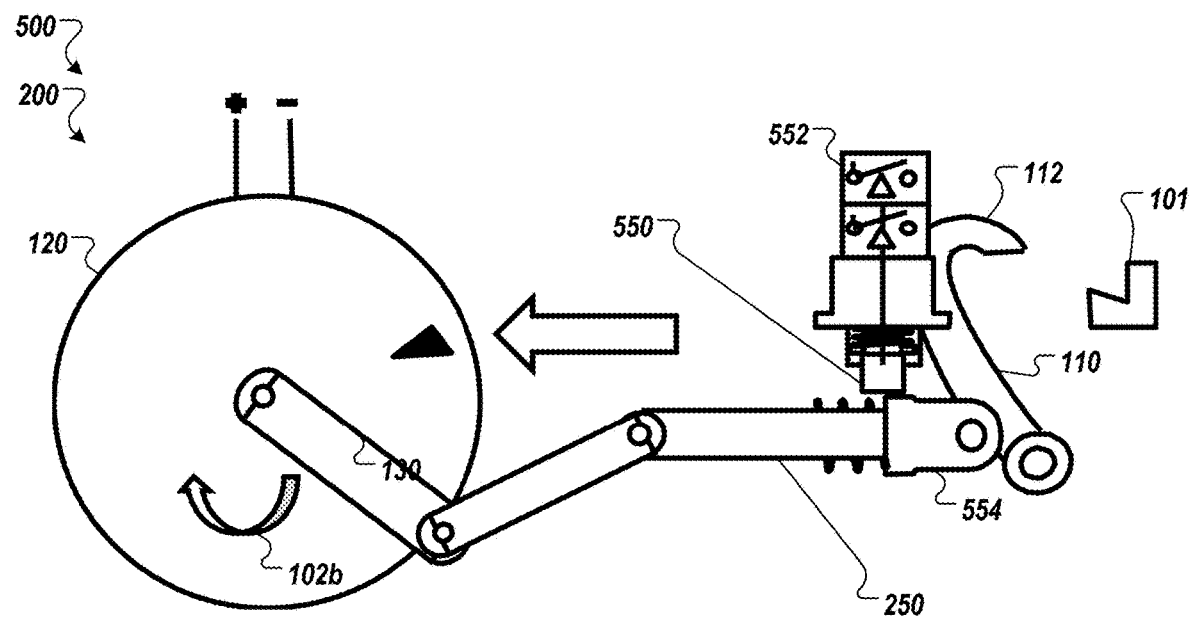

FIGS. 5A and 5B are schematic diagrams that show an example of another system 500 for locking a TRAS. In general, the system 500 is the system 200 of FIGS. 2A and 2B, with the addition of a second stop 550. In some embodiments, the stop 550 can be added to the system 100 of FIGS. 1A and 1B as well.

The stop 550 is engageable to selectively block (baulk) or permit (unbaulk) linear movement of the second link arm 250 away from the latched configuration, as shown in FIG. 5A. An actuator 552 is controllable to actuate the movement of the stop 550. For example, the stop 550 can be mounted on a piston that is configured to extend and retract the stop 550 into and out of the path of motion of the second link arm 250, and the actuator 552 can provide fluid (e.g., hydraulic, pneumatic) to drive the motion of the piston. In another example, the stop 550 can be mounted on a solenoid (e.g., a baulking solenoid) or other linear or rotary actuator that is configured to move the stop 550 into and out of the path of motion of the second link arm 250, and the actuator 552 can provide electrical power (e.g., a switch, a motor driver) to drive the motion of the stop 550.

In the illustrated example, the stop 550 is extended so as to interfere with rightward (as illustrated) movement of a stop member 554 affixed to the second link arm 250. In the extended configuration, the back-driving forces applied to the latch hook 110 by the receiver 101 are resisted, and the rotor arm 130 is held in the latched, over-center position illustrated by FIG. 5A. With the back-driving forces being resisted, the catch 112 is kept in engagement with the receiver 101.

Referring now to FIG. 5B, the actuator 552 can actuated the stop 550 such that the stop 550 is moved out of the path of the stop member 554. As such, the catch 112 can be disengaged from contact with the receiver 101.

Figure 6A:
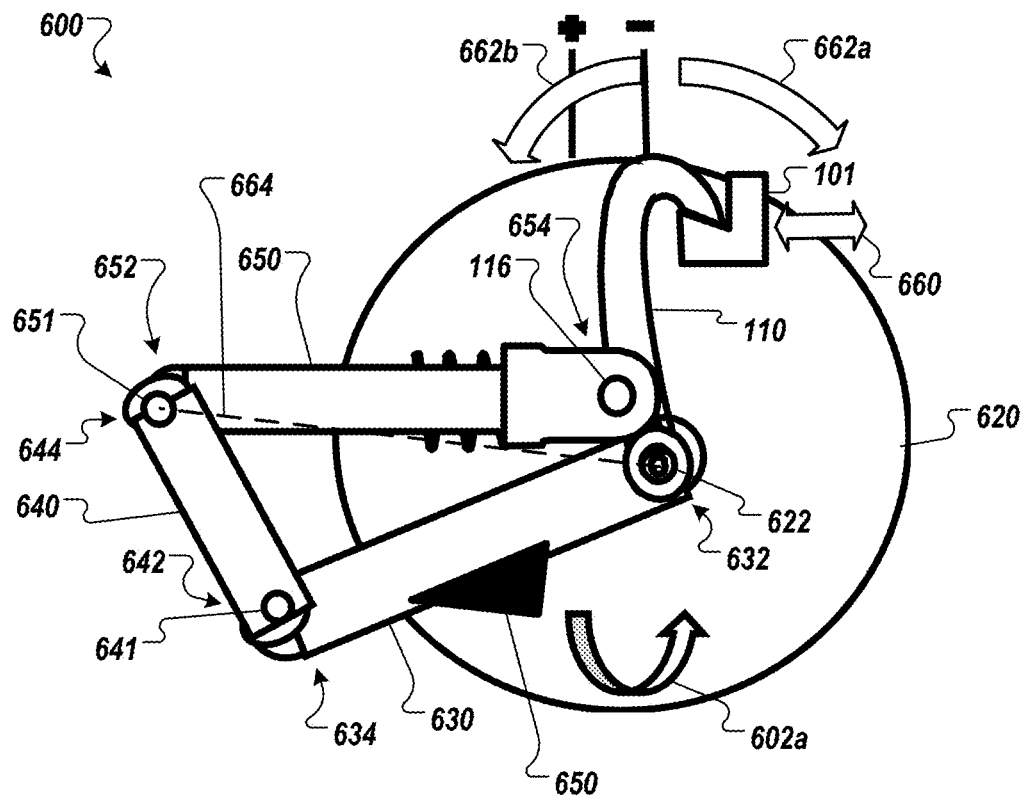
FIGS. 6A and 6B are schematic diagrams that show another example of a system for locking a TRAS.
Figure 6B:
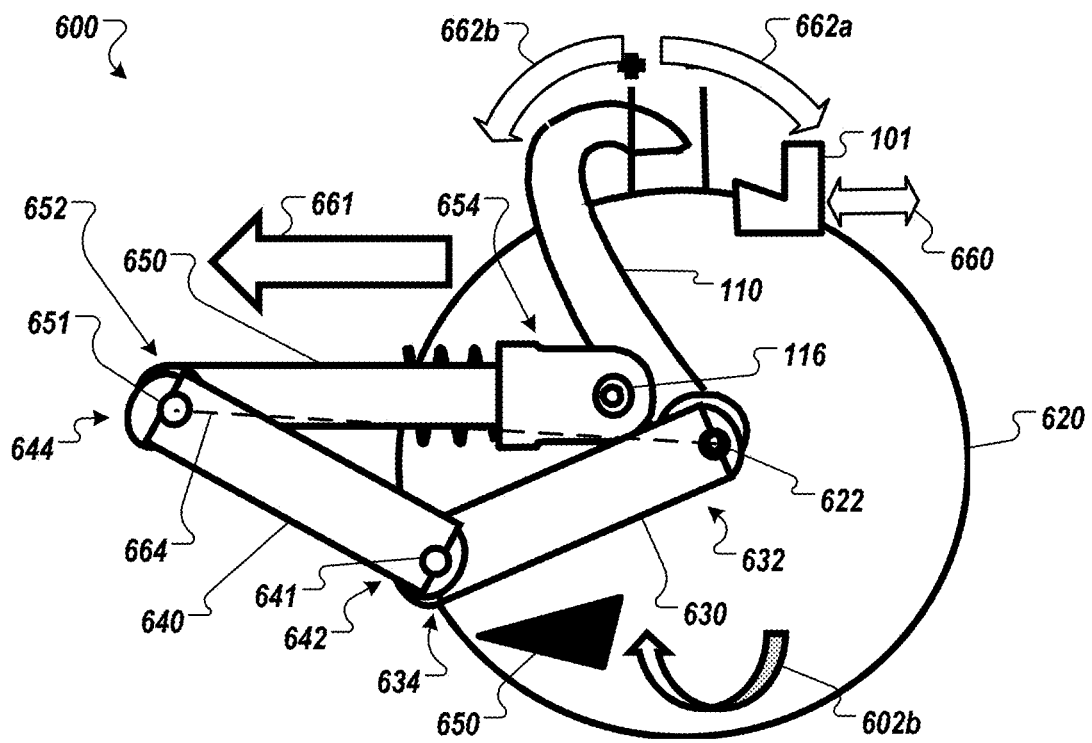

FIGS. 6A and 6B are schematic diagrams that show an example of another system 600 for locking a TRAS. In general, the system 600 is a re-arrangement of the system 200 of FIGS. 2A and 2B, such that the axes of the rotor shaft 122 and the first pivotal mount 116 are close or share a common axis. In some embodiments, the system 600 can be a more compact version of the system 200.

The system 600 includes the latch hook 110. A rotary actuator 620 is configured to selectably rotate a rotor shaft 622 in the first rotary direction (e.g., counterclockwise in the current example), represented by the arrow 602a in FIG. 6A, and in the second rotary direction, represented by the arrow 602b in FIG. 6B, opposite the first rotary direction 602a (e.g., clockwise in the current example).

A rotor arm 630 is coupled to the rotor shaft 622 at a first arm end 632 and extends radially outward from the rotor shaft 622 to the second arm end 634. A first link arm 640 (e.g., idler link) is pivotably connected to the second arm end 634 by a third pivotal mount 641 at a first link end 642, and is pivotably connected to a second link arm 650 by a fourth pivotal mount 651 at a second link end 644 opposite the first link end 642. The second link arm 650 extends from the fourth pivotal mount 651 at a third link end 652 to a fourth link end 654 opposite the third link end 652. The second link arm 650 is pivotably connected to the latch hook 110 by the second pivotal mount 116. The motion of the second link arm 650 is substantially linear, represented by the arrow 661 in FIG. 6B.

Returning to FIG. 6A, the system 600 also includes a stop 650. The stop 650 is configured to prevent rotation of the rotor arm 630 and the rotor shaft 622 past a first rotary position in the first rotary direction 602a. For example, in FIG. 6A, the rotor arm 630 is rotated counterclockwise by the rotor shaft 622 to contact the stop 650 at a rotary position that is slightly greater than 90 degrees (e.g., a bit less than the nine o'clock position) from top dead center (e.g., the twelve o'clock position).

Still referring to FIG. 6A, the catch 112 is engaged with the receiver 101. The receiver 101 is confined to move linearly, substantially perpendicular to the latch hook 110, as illustrated by arrows 660. The rotor arm 630, the first link arm 640, and the second link arm 650 form a linkage in which pivotal movement of the latch hook 110 can urge rotation of the rotary actuator 620. Counterclockwise motion of the latch arm 110 will compress the second link arm 650, tension the first link arm 640, tension the rotor arm 630, cause the rotor arm 630 to pivot relative to the first link arm 640 about the third pivotal mount 641, and in turn urge rotation of the rotary actuator 620.

Stability of the system 600 is provided in part by the stop 650. The stop 650, the rotor shaft 622, the rotor arm 630, the third pivotal mount 641, the link arm 640, the second link arm 650, and the fourth pivotal mount 651 form an over center linkage that prevents back-driving of the system 600.

In the illustrated example, the rotor shaft 622 is rotated such that the rotor arm 630 is rotated past direct alignment between the rotor shaft 622 and the fourth pivotal mount 651, as represented by line 264, such that the third pivotal mount 641 is not positioned along the line 664. The third pivotal mount 641 and the rotor arm 630 are positioned counterclockwise relative to the line 664. As such, counterclockwise motion of the latch hook 110 (e.g., caused by leftward, back-driving movement of the receiver toward from the system 200) can urge counterclockwise rotation of the rotary actuator 620. Counterclockwise rotation of the rotor arm 630 is limited by the stop 650. As such, the stop 650 resists further counterclockwise rotation of the rotor arm 630, and by resisting such further rotation the stop 650 resists the counterclockwise motion of the latch arm 110 caused by the leftward, back-driving movement of the receiver 101. With the back-driving forces being resisted, the catch 112 is kept in engagement with the receiver 101.

In the illustrated configuration, movement of the receiver 101 away from the system 600 (e.g., to the right) urges contact between the catch 112 and the receiver 101, which in turn urges clockwise pivotal motion, represented by arrow 662a, of the latch hook 110. Such pivotal motion draws the catch 112 into more forceful engagement with the receiver 101, resisting disengagement of the receiver 101 from the system 600.

Referring now to FIG. 6B, the system 600 is shown in a disengaged configuration. In the illustrated example, the rotary actuator 620 is actuated to rotate the rotor arm 630 clockwise, away from the stop 650, closer to the line 664. Such rotary motion urges counterclockwise motion 662b of the latch hook 110, causing the catch 112 to disengage from the receiver 101.

Figure 7:
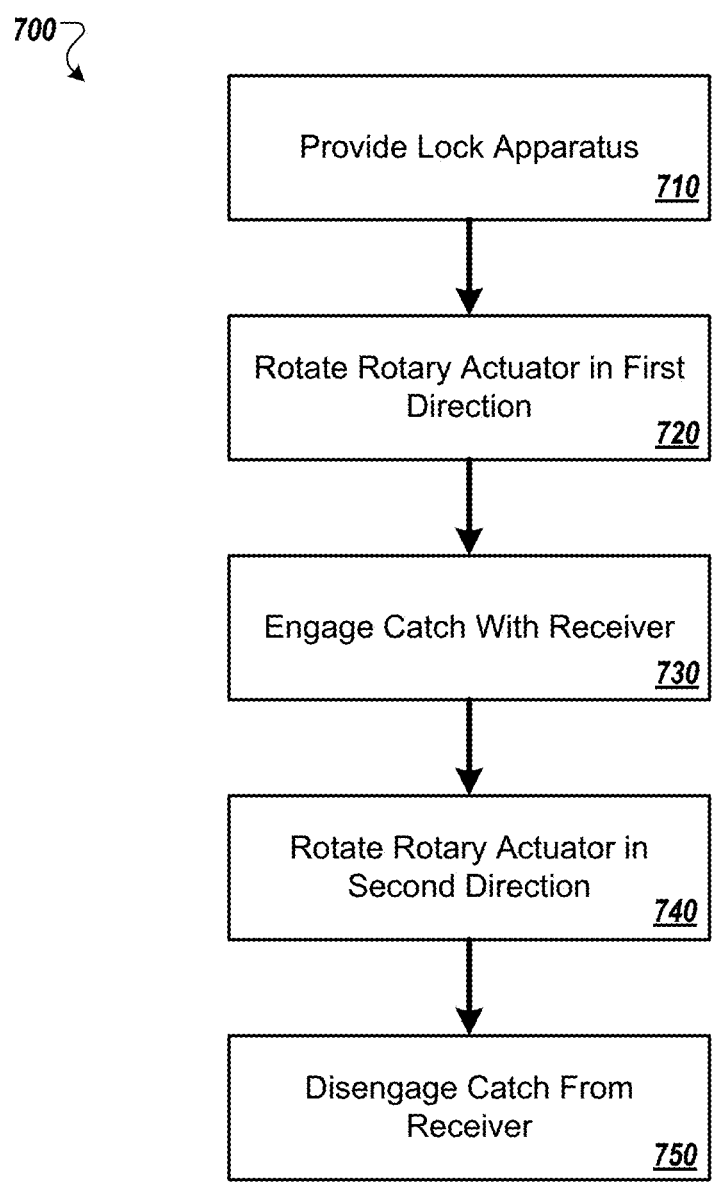
FIG. 7 is flow chart that shows an example of a process for locking a TRAS.

FIG. 7 is flow chart that shows an example of a process 700 for locking a TRAS. In some implementations, the process 700 can be performed using the example systems 100, 200, 300, 400, 500, and/or 600 of FIGS. 1A-6B.

At 710, a lock apparatus is provided. The lock apparatus includes a latch hook having a catch at a first latch end, a first pivotal mount at a second latch end opposite the first latch end, and a second pivotal mount, a rotary actuator configured to selectably rotate a rotor shaft in a first rotary direction and in a second rotary direction opposite the first rotary direction, a rotor arm coupled to the rotor shaft at a first arm end and extending radially outward from the rotor shaft to a second arm end opposite the first arm end, and a link arm pivotably connected to the second arm end at a first link end, and pivotably connected to the second pivotal mount at a second link end opposite the first link end. For example, the example system 100 can be provided.

In some implementations, the lock apparatus can also include a second link arm pivotably connected to the rotor arm at the second shaft end and pivotally connected to the link arm at the first link end, and the process 700 can also include constraining, by a guide, angular movement of the link arm, and moving the link arm linearly through the guide. For example, the system 200 includes the second link arm 250 and the guide 202, and the second link arm 250 can be moved linearly through the guide 202.

At 720, the rotary actuator is rotated in a first direction to a first rotary position. For example, the rotary actuator 120 can be rotated in the direction 102*a* from the configuration shown in FIG. 1B to the configuration shown in FIG. 1A.

At 730 the catch is engaged with a receiver during the rotating. For example, as the rotary actuator 120 is rotated in the direction 102*a* from the configuration shown in FIG. 1B, in which the catch 112 is disengaged from the receiver 101, to the configuration shown in FIG. 1A, the catch 112 is moved into engaging contact with the receiver 101.

In some implementations, the process 700 can include contacting a stop at the first rotary position, and stopping, by the stop, rotation of the rotary actuator in the first rotary direction at the first rotary position. For example, the rotor arm 130 can rotated into contact with the stop 150 by the rotary actuator 120. When the rotor arm 130 contacts the stop 150, rotation of the rotary actuator 120 in the direction 102*a* is stopped.

In some implementations, the process 700 can include applying a back force to the catch while rotary actuator is proximal the first rotary position, urging rotation of the rotary actuator in the first rotary direction, resisting, by the stop, the back force, and maintaining engagement of the catch and the receiver. For example, the receiver 101 can back-load the system 100 (e.g., by moving leftward in the view shown in FIG. 1A). Such back-loading can urge counterclockwise rotation (e.g., in direction 102*a*) of the rotor arm 130 and the rotary actuator 120. Such rotation can cause the rotor arm 130 to contact the stop 150, and the stop 150 can resist further rotation in the direction 102*a* and keep the catch 112 in latching contact with the receiver 101 (e.g., through the linkage of the rotor arm 130, the link arm 140, and the latch hook 110).

The method of claim 10, further comprising urging, by a bias member, the rotary actuator in the first rotary direction.

At 740, the rotary actuator is rotated in a second direction opposite the first direction to a second rotary position. For example, the rotary actuator 120 can be rotated in the direction 102*b* from the configuration shown in FIG. 1A to the configuration shown in FIG. 1B.

At 750, the catch is disengaged from the receiver. For example, as the rotary actuator 120 is rotated in the direction 102*b* from the configuration shown in FIG. 1A, in which the catch 112 is engaged in contact with the receiver 101, to the configuration shown in FIG. 1B, the catch 112 is moved out of engaging contact with the receiver 101.

In some implementations, the process 700 can include configuring a moveable stop in a first configuration, urging rotation of the rotary actuator in the second rotary direction, contacting the moveable stop at a second rotary position, stopping, by the moveable stop in the first configuration, rotation of the rotary actuator in the second rotary direction at the second rotary position, configuring the moveable stop in a second configuration, urging rotation of the rotary actuator in the second rotary direction, and rotating the rotary actuator in the second rotary direction past the second position. For example, the system 400 includes the stop 450. The stop 450 can controlled (e.g., actuated) to prevent and permit movement of the rotor arm 130 away from the latched position shown in FIG. 4A. With the rotary actuator 120 and the rotor arm 130 in the latched configuration and the stop 450 engaged, the rotor arm 130 is substantially maintained in the latched position. If the rotary actuator 120 is rotated in the clockwise direction 102*b*, then the motion will be resisted by the contact between the rotor arm 130 and the stop 450, and the system 400 will be held in the latched configuration. If the stop 450 is disengaged and the rotary actuator 120 is rotated in the clockwise direction 102*b*, then the stop 450 will not interfere with the motion of the rotor arm 130 as it moves toward the unlatched configuration shown in FIG. 4B.

In some implementations, the process 700 can include configuring a moveable stop in a first configuration, urging movement of the link arm, stopping, by the moveable stop in the first configuration, movement of the link arm, configuring the moveable stop in a second configuration, urging movement of the link arm, and permitting, by the moveable stop in the second configuration, movement of the link arm. For example, the system 500 includes the stop 550. The stop 550 can controlled (e.g., actuated) to prevent and permit movement of the second link arm 250 away from the latched position shown in FIG. 5A. With the rotary actuator 120 and the second link arm 250 in the latched configuration and the stop 550 engaged, the second link arm 250 is substantially maintained in the latched position. If the rotary actuator 120 is rotated in the clockwise direction 102*b*, then the motion will be resisted by the contact between the second link arm 250 and the stop member 554, and the system 500 will be held in the latched configuration. If the stop 550 is disengaged and the rotary actuator 120 is rotated in the clockwise direction 102*b*, then the stop 550 will not interfere with the stop member 554 and motion of the second link arm 250 as they move toward the unlatched configuration shown in FIG. 5B.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method for reversible locking comprising:
   providing a lock apparatus comprising:
   a latch hook having a catch at a first latch end, and the latch hook configured to pivot about a first pivotal mount at a second latch end of the latch hook opposite the first latch end, and the latch hook having a second pivotal mount;
   a rotary actuator comprising at least one of an electric motor, a rotary electric solenoid, and a rotary fluid actuator, wherein the rotary actuator having a rotor shaft, and the rotary actuator is configured to selectably rotate a rotor shaft in a first rotary direction and the rotary actuator is configured to selectably urge rotation of the rotor shaft in a second rotary direction opposite the first rotary direction;
   a rotor arm rotationally fixed to the rotor shaft at a first arm end, where the first arm end originating at the rotor shaft, and extending radially outward from the rotor shaft to a second arm end opposite the first arm end, and the rotor arm configured to urge rotation of the rotary actuator; and
   a link arm pivotably connected to the second arm end at a first link end, and the link arm pivotably connected to the second pivotal mount at a second link end opposite the first link end;
rotating the rotary actuator in a first direction to a first rotary position;
engaging, during the rotating, the catch with a receiver;
rotating the rotary actuator in a second direction opposite the first direction to a second rotary position; and
disengaging the catch from the receiver.

2. The method of claim 1, further comprising:
contacting a stop at the first rotary position; and
stopping, by the stop, rotation of the rotary actuator in the first rotary direction at the first rotary position.

3. The method of claim 1, further comprising:
applying a back force to the catch while rotary actuator is proximal the first rotary position;
urging rotation of the rotary actuator in the first rotary direction;
resisting, by the stop, the back force; and
maintaining engagement of the catch and the receiver.

4. The method of claim 1, further comprising urging, by a bias member, the rotary actuator in the first rotary direction.

5. The method of claim 1, further comprising:
configuring a moveable stop in a first configuration;
urging rotation of the rotary actuator in the second rotary direction;
contacting the moveable stop at a second rotary position;
stopping, by the moveable stop in the first configuration, rotation of the rotary actuator in the second rotary direction at the second rotary position;
configuring the moveable stop in a second configuration;
urging rotation of the rotary actuator in the second rotary direction; and
rotating the rotary actuator in the second rotary direction past the second position.

6. The method of claim 1, further comprising:
configuring a moveable stop in a first configuration;
urging movement of the link arm;
stopping, by the moveable stop in the first configuration, movement of the link arm;
configuring the moveable stop in a second configuration;
urging movement of the link arm; and
permitting, by the moveable stop in the second configuration, movement of the link arm.

7. The method of claim 1, wherein the lock apparatus further comprises a second link arm pivotally connected to the rotor arm at the second shaft end and pivotally connected to the link arm at the first link end, the method further comprising:
constraining, by a guide, angular movement of the link arm; and
moving the link arm linearly through the guide.

* * * * *